United States Patent
Chen

(10) Patent No.: US 11,611,915 B2
(45) Date of Patent: Mar. 21, 2023

(54) CONTROL METHOD FOR REPORTING INFORMATION, CONTROL DEVICE FOR REPORTING INFORMATION AND STORAGE MEDIUM THEREOF

(71) Applicant: BEIJING XIAOMI MOBILE SOFTWARE CO., LTD., Beijing (CN)

(72) Inventor: Long Chen, Beijing (CN)

(73) Assignee: BEIJING XIAOMI MOBILE SOFTWARE CO., LTD., Beijing (CN)

(*) Notice: Subject to any disclaimer, the term of this patent is extended or adjusted under 35 U.S.C. 154(b) by 139 days.

(21) Appl. No.: 17/105,965

(22) Filed: Nov. 27, 2020

(65) Prior Publication Data

US 2021/0410023 A1    Dec. 30, 2021

(30) Foreign Application Priority Data

Jun. 29, 2020 (CN) .......................... 202010609830.X

(51) Int. Cl.
    *H04W 36/00* (2009.01)
    *H04W 36/14* (2009.01)
    *H04W 48/18* (2009.01)

(52) U.S. Cl.
    CPC ... *H04W 36/0058* (2018.08); *H04W 36/0085* (2018.08); *H04W 36/14* (2013.01); *H04W 48/18* (2013.01)

(58) Field of Classification Search
    CPC ............... H04W 36/245; H04W 36/30; H04W 36/0055; H04W 36/00837; H04W 36/08; H04W 48/18; H04W 36/14
    See application file for complete search history.

(56) References Cited

U.S. PATENT DOCUMENTS

| 2011/0201279 A1 | 8/2011 | Suzuki et al. |
| 2018/0035346 A1 | 2/2018 | Fujishiro et al. |
| 2019/0182742 A1 | 6/2019 | Fujishiro et al. |

FOREIGN PATENT DOCUMENTS

| CN | 111065127 A | | 4/2020 |
| CN | 111417156 A | * | 7/2020 |
| EP | 2 360 961 A2 | | 8/2011 |

(Continued)

OTHER PUBLICATIONS

Extended European Search Report dated Jul. 1, 2021 in corresponding European Patent Application No. 21151775.0, 11 pages.

*Primary Examiner* — Nam T Huynh
(74) *Attorney, Agent, or Firm* — Oblon, McClelland, Maier & Neustadt, L.L.P.

(57) ABSTRACT

Aspects of the present disclosure relate to a control method for reporting information, a control device for reporting information, and a storage medium. The method can include recording, in response to an action of network reselection of a terminal device, reselection information of the network reselection, and determining whether the reselection information meets a preset condition, and disabling the function of the terminal device to report the reselection information if it is determined that the reselection information meets the preset condition. In this way, the power consumption caused by the reporting of the reselection information when the terminal device performs over network reselection may be prevented, thereby saving the power of the battery of the terminal device.

3 Claims, 7 Drawing Sheets

---

Recording reselection information of the network reselection, in response to an action of network reselection of a terminal device — S11

Determining whether the reselection information meets a preset condition, and disabling the function of the terminal device to report the reselection information if it is determined that the reselection information meets the preset condition — S12

(56) References Cited

FOREIGN PATENT DOCUMENTS

EP  3 282 456 A1  2/2018
EP  3 282 756 A1  2/2018
WO  WO 2018/127215 A1  7/2018

* cited by examiner

CONTROL METHOD FOR REPORTING INFORMATION, CONTROL DEVICE FOR REPORTING INFORMATION AND STORAGE MEDIUM THEREOF

CROSS-REFERENCE

This application is based upon and claims priority to Chinese Patent Application No. 202010609830.X, filed on Jun. 29, 2020, the entire contents of which are incorporated herein by reference.

TECHNICAL FIELD

The present disclosure relates to smart terminal technologies, including to a control method for reporting information, a control device for reporting information and a storage medium thereof.

BACKGROUND

When a terminal device performs over cell reselection in some network environments, power consumption of the terminal device increases in these network environments. Once the terminal device quits the network environments, the power consumption can return to normal. It is particularly serious in the transformation of the 5th Generation Mobile Networks (5G) environment where service providers have changed network-side parameters or misconfigured network parameters. For example, in Long Term Evolution (LTE) networks, the cell reselection priority of cell A is higher than that of cell B, but the signal strength of cell B is stronger than that of cell A, then, the terminal device will keeps performing cell reselection, i.e., Ping-Pong reselection, between cell A and cell B consistently, which increases power consumption of the terminal device and deteriorates its battery life.

By adjusting the network parameter configuration of the service providers, the network environments in which over cell reselection occurs can be avoided and the terminal device will be prevented from performing over cell reselection therein. However, there are not many areas that have such network environment, so it is extremely difficult to motivate the service providers to modify the network parameter configuration on the network side. Further, the cost of adjusting the network parameter configuration on the network side can be relatively high.

SUMMARY

The present disclosure provides a control method for reporting information, a control device for reporting information and a storage medium thereof, in order to overcome problems in the relevant technology.

According to a first aspect of the present disclosure, there is provided a control method for reporting information. The method can include recording reselection information of network reselection, in response to an action of the network reselection of the terminal device, and determining whether the reselection information meets a preset condition, and disabling function of the terminal device to report the reselection information if it is determined that the reselection information meets the preset condition.

According to a second aspect of the present disclosure, there is provided a control device for reporting information. The device can include a processor having memory for storing instructions executable by the processor. The processor can be configured to record reselection information of the network reselection, in response to an action of network reselection of a terminal device, and determine whether the reselection information meets a preset condition, and disable the function of the terminal device to report the reselection information if it is determined that the reselection information meets the preset condition.

According to a third aspect of the present disclosure, there is provided a non-transitory computer-readable storage medium having stored therein computer program instructions that, when executed by a processor, implement the steps of the method according to the first aspect of the present disclosure.

The technical solutions provided by the embodiments of the present disclosure can provide beneficial effects. For example, the reselection information of the network reselection is recorded in response to the action of the network reselection performed by the terminal device, and the function of the terminal device to report the reselection information is disabled if it is determined that the reselection information meets the preset condition. In this way, it is possible to avoid power consumption caused by the reporting of the reselection information when the terminal device performs over network reselection, thus reducing the power consumption caused by the network reselection, optimizing the management of the power of the battery of the terminal device, and saving the power of the battery of the terminal device.

It is to be understood that both the foregoing general description and the following detailed description are exemplary and explanatory only and are not restrictive of the disclosure, as claimed.

BRIEF DESCRIPTION OF THE DRAWINGS

The accompanying drawings, which are incorporated in and constitute a part of this specification, illustrate exemplary embodiments consistent with the disclosure and, together with the description, serve to explain the principles of the disclosure.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of apparatuses and methods consistent with aspects related to the disclosure as recited in the appended claims.

It should be noted that terms such as "first" and "second" are used in the specification, claims and drawings of the present disclosure to distinguish between similar objects, and are not necessarily interpreted as describing a particular order or a precedence order.

Before a control method for reporting information, a control device for reporting information and a storage medium thereof provided by the present disclosure are described, scenarios of the present disclosure will be introduced first, wherein network reselection may be for example LTE network reselection, or for example Wi-Fi network reselection. Here the LTE network reselection, which is called cell reselection as well, will be taken as an example. Cell reselection refers to a procedure in which the best cell is selected to provide service signals by monitoring the signal quality of a neighboring cell and the current cell. When signal quality and level of the neighboring cell meet the S criteria and a certain reselection decision criteria, a terminal device will access the cell and reside in the cell, and record and report reselection information such as cell information, frequency point information and signal strength information of the resided cell.

However, since the current cell has a higher cell reselection priority than that of the resided cell, the terminal device will perform network reselection to reselect the current cell, and records and reports reselection information such as cell information, frequency point information and signal strength information of the current cell, which is circulated repeatedly. The recording of reselection information occupies resources of the terminal device, and the reporting of reselection information increases power consumption of the terminal device.

Figure 1:
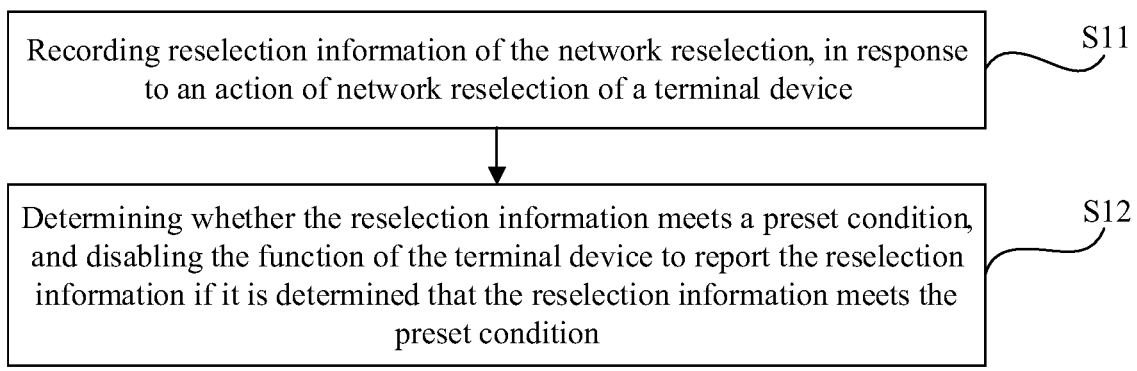
FIG. 1 is a flow chart showing a control method for reporting information according to an exemplary embodiment.

FIG. 1 is a flow chart showing a control method for reporting information according to an exemplary embodiment. As shown in FIG. 1, the method is used in a terminal device and includes the following steps.

In step S11, reselection information of network reselection is recorded in response to an action of the network reselection performed by the terminal device.

In step S12, it is determined whether the reselection information meets a preset condition, and function of the terminal device to report the reselection information is disabled if it is determined that the reselection information meets the preset condition.

Specifically, when a modem of the terminal device performs network reselection from the current cell to a neighboring cell, reselection information of the network reselection is recorded in response to the action of the network reselection performed by the modem. The reselection information may include, for example, information on connection duration for accessing the neighboring cell. In this case, determining whether the reselection information meets the preset condition in the aforementioned step S12 may refer to determining whether the connection duration for accessing the neighboring cell exceeds preset connection duration. The preset condition will not be met if the connection duration for accessing the neighboring cell exceeds the preset connection duration; and the preset condition will be met if the connection duration for accessing the neighboring cell does not exceed the preset connection duration.

Further, in the case where it is determined that the reselection information meets the preset condition (for example, the connection duration for accessing the neighboring cell is 3 ms and does not exceed the preset connection duration, 10 ms), the function of the terminal device to report the reselection information is disabled, for example, the function of the modem of the terminal device to report the reselection information to the upper layer of the terminal device is disabled. It is to be understood that, if the connection duration for accessing the neighboring cell exceeds the preset connection duration, it is indicated that the network reselection is unsuccessful and no reselection information needs to be reported.

Optionally, when the terminal device quits the network reselection, the function of the terminal device to report network information is enabled, so as to report network information of the currently-connected network.

It is worth noting that, when the function of the terminal device to report reselection information is disabled, the terminal device is still performing network reselection, and only does not report the reselection information to the upper layer of the terminal device. For example, when the function of the terminal device to report the reselection information is disabled, the modem of the terminal device is still performing network reselection, but the modem does not report the reselection information to the upper layer of the terminal device. This is different from the following description of disabling the network reselection function of the terminal device. When the network reselection function of the terminal device is disabled, the terminal device no longer performs network reselection. That is to say, the modem selects a network and no longer performs network reselection, and accordingly no reselection information needs to be reported.

The above-mentioned technical solution records the reselection information of the network reselection in response to the action of the network reselection performed by the terminal device, and then determines whether the reselection information meets the preset condition, and disables the function of the terminal device to report the reselection information if the reselection information meets the preset condition. In this way, it is possible to avoid power consumption that is caused by reporting the reselection information when the terminal device performs over network reselection, thus reducing the power consumption caused by the network reselection, optimizing the management of battery capacity of the terminal device, and saving the battery capacity of the terminal device.

Figure 2:
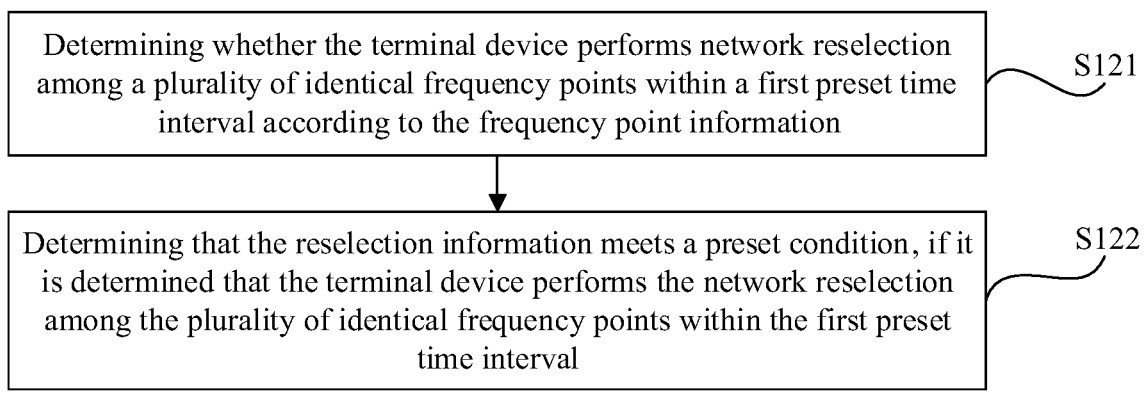
FIG. 2 is a flow chart showing a step S21 according to an exemplary embodiment.

In a possible implementation manner, the reselection information includes frequency point information. FIG. 2 is a flow chart showing a step S21 according to an exemplary embodiment. As shown in FIG. 2, determining whether the reselection information meets the preset condition includes the following steps.

In step S121, it is determined whether the terminal device performs the network reselection among a plurality of identical frequency points within a first preset time interval according to the frequency point information.

In step S122, it is determined that the reselection information meets the preset condition, if it is determined that the terminal device performs the network reselection among the plurality of identical frequency points within the first preset time interval.

Specifically, performing the network reselection among the plurality of identical frequency points within the first preset time interval is called the Ping-Pong reselection, during which the terminal device will report the reselection information. In response to the action of network reselection performed by the terminal device, frequency point information of respective cells accessed upon the network reselection is recorded, wherein the frequency point information is used to characterize a fixed frequency of a corresponding cell. Further, it is determined whether the terminal device performs the network reselection among the plurality of identical frequency points within the first preset time interval according to the recorded frequency point information.

For example, if the network reselection is performed among a plurality of identical frequency points within the first preset time interval of 3 minutes, the reselection information will be determined as meeting the preset condition, and further, the function of the terminal device to report the reselection information is disabled. In this way, it is possible to determine whether to disable the function of the terminal device to report the reselection information according to the frequency point information of the network reselection, thus reducing power consumption of the terminal device due to reporting the reselection information.

The plurality of identical frequency points may be determined according to actual network reselection. For example, the current cell I of the terminal device has four neighboring cells A, B, C and D. The network signal strength of the neighboring cells A, B, and C is stronger than that of the neighboring cell D, at this time, network reselection may be performed between the current cell I and the neighboring cells A, B and C. The plurality of identical frequency points are frequency points of the current cell I and the neighboring cells A, B and C. Namely, the network reselection of the terminal device will Ping-Pong (select) between the current cell I and the neighboring cells A, B, and C.

As the terminal device is moved, network signal strength of the neighboring cell D received by the terminal device is getting stronger and stronger as the terminal device is approaching the neighboring cell D. When the network signal strength of the neighboring cell D is comparable with those of the neighboring cells A, B and C, the terminal device may perform network reselection between the current cell I and the neighboring cells A, B, C and D. The plurality of identical frequency points are frequency points of the current cell I and the neighboring cells A, B, C and D. Namely, the terminal device will Ping-Pong between the current cell I and the neighboring cells A, B, C and D to perform network reselection.

Figure 3:
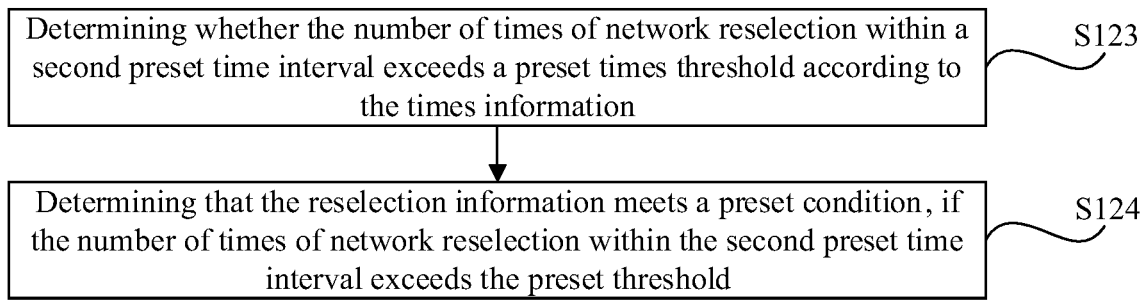
FIG. 3 is a flow chart showing another step S21 according to an exemplary embodiment.

In another possible implementation manner, the reselection information includes times information. FIG. 3 is a flow chart showing another step S21 according to an exemplary embodiment. As shown in FIG. 3, determining whether the reselection information meets the preset condition includes the following steps.

In step S123, it is determined whether the number of times of network reselection within a second preset time interval exceeds a preset times threshold according to the times information.

In step S124, it is determined that the reselection information meets a preset condition, if the number of times of network reselection within the second preset time interval exceeds the preset times threshold.

Like terms "first" and "second" used to distinguish similar objects, terms such as "S122 and S123" are used in the specification and drawings of the present disclosure to distinguish similar objects, and are not interpreted as describing a particular order or a precedence order. Specifically, when the terminal device performs network reselection for one time, the number of times of network reselections increases by one. If the cumulated number of times of network reselections exceeds the preset times threshold in the second preset time interval, it is determined that the reselection information meets the preset condition. For example, within the second preset time interval of 2 minutes, the number of times of network reselections is 15, which exceeds the preset times threshold 10, it is determined that the reselection information meets the preset condition. Further, the function of the terminal device to report the reselection information is disabled.

In an implementable manner, users can set a preset times threshold according to actual demand. In this way, when the remaining power of the terminal device is low, for example, a small preset times threshold may be set, thus saving power consumption caused by reporting the reselection information. Similarly, the second preset time interval may be set according to actual needs as well.

In this way, whether to disable the function of the terminal device to report the reselection information according to the number of times of network reselections can be determined, thereby reducing power consumption of the terminal device for reporting the reselection information. In addition, the preset times threshold may be set as required, which increases the flexibility of disabling the function of the terminal device to report the reselection information.

Figure 4:
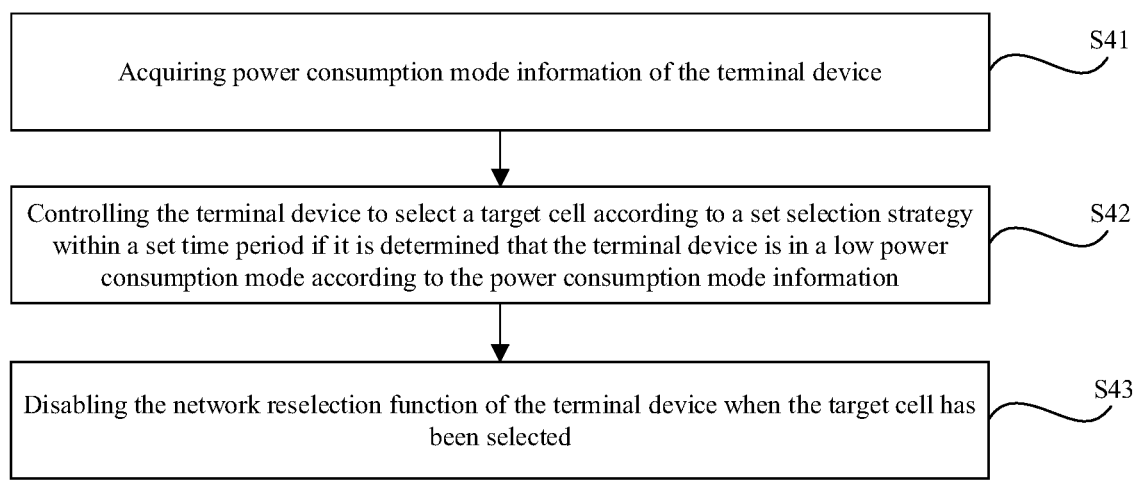
FIG. 4 is a flow chart showing another control method for reporting information according to an exemplary embodiment.

Optionally, FIG. 4 is a flow chart showing another control method for reporting information according to an exemplary embodiment. As shown in FIG. 4, the method further includes the following steps.

In step S41, power consumption mode information of the terminal device may be acquired.

In step S42, if it is determined that the terminal device is in a low power consumption mode according to the power consumption mode information, the terminal device may be controlled to select a target cell according to a set selection strategy within a set time period.

In step S43, when the target cell has been selected, the network reselection function of the terminal device is disabled.

It is to be understood that the terminal device reports the reselection information to the upper layer of the terminal device through its modem. The modem will consume the power of the terminal device not only during the reporting of the reselection information but also during network reselection.

Optionally, the power consumption mode information of the terminal device is acquired and the power consumption mode of the terminal device at the time of network reselection is determined. At the time of network reselection, if the terminal device is in the low power consumption mode, the terminal device may be controlled to select the target cell according to the set selection strategy within the set time period, wherein the low power consumption mode refers to, for example, that the remaining power of the battery of the terminal device is lower than a preset power threshold, and the terminal device is in a sleep mode.

Optionally, the set selection strategy may be a strategy for selecting a cell with the strongest network signal strength at present, or selecting a cell with the highest cell reselection priority at present.

Further, when the terminal device has selected the cell with the strongest signal strength at present as the target cell, or the cell with the highest cell reselection priority at present as the target cell, the network reselection function of the terminal device is disabled, and the terminal device remains in a status of network connection with the target cell and stops performing the network reselection, which can be interpreted as that no reselection information of the network reselection needs to be reported.

In this way, power consumption due to frequent network reselection of terminal device can be avoided. Since, in the low power consumption mode, there is less remaining power of the battery of the terminal device, and the remaining power of the battery of the terminal device will be quickly consumed during frequent network reselection, the battery life will become short. For example, in the sleep mode, the terminal device has lower requirements for the network, and there is no need to perform network reselection, which can reduce power consumption of the terminal device in the low power consumption mode.

Optionally, the method can further include acquiring a network signal strength of the target cell before arrival of a cut-off time of the set time period, and enabling the network reselection function of the terminal device in the low power consumption mode if the network signal strength is lower than a preset strength threshold, and/or enabling the network reselection function of the terminal device in the low power consumption mode upon arrival of the cut-off time of the set time period.

It is to be understood that the preset strength threshold can ensure that the network connected with the terminal device normally sends and receives data. According to the actual speed at which data are sent and received, the preset strength threshold may vary with the network to which the terminal device is connected.

In the case of network connection with the target cell, if the network signal strength of the target cell is lower than the preset strength threshold, it is indicated that the network signal strength of the target cell cannot meet network communication of the terminal device, at this time, the network reselection function of the terminal device needs to be enabled such that the terminal device can perform network reselection. At this time, the terminal device is still in the low power consumption mode, and the function of the terminal device to report reselection information is still in a disabling state. Thus, enabling the network reselection function can ensure good network connection of the terminal device, and avoid reporting the reselection information due to poor network connection, which can save the power consumption in the low power consumption mode.

Optionally, the network reselection function of the terminal device in the low power consumption mode is enabled upon arrival of the cut-off time of the set time period, such that the terminal device can perform network reselection. At this time, the terminal device is still in the low power consumption mode, and the function of the terminal device to report reselection information is still in a disabling state.

Figure 5:
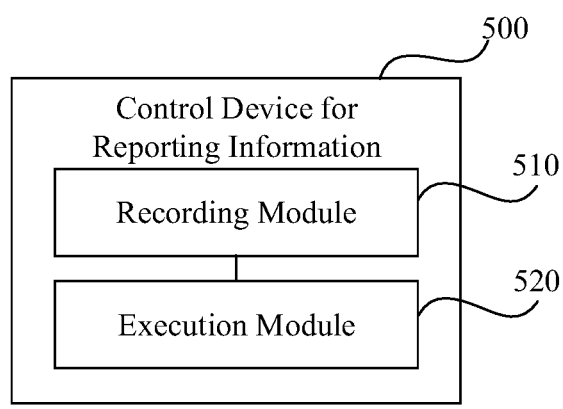
FIG. 5 is a block diagram illustrating a control device for reporting information according to an exemplary embodiment.

FIG. 5 is a block diagram illustrating a control device for reporting information according to an exemplary embodiment. As shown in FIG. 5, the device 500 includes a recording module 510 and an execution module 520. Of course, it should be understood that one or more of the modules described in this disclosure can be implemented by circuitry.

The recording module 510 is configured to record reselection information of the network reselection in response to the action of network reselection of the terminal device.

The execution module 520 is configured to determine whether the reselection information meets a preset condition, and disable the function of the terminal device to report the reselection information if it is determined that the reselection information meets the preset condition.

Optionally, the reselection information includes frequency point information. The execution module 520 can further include a first determination submodule that is configured to determine whether the terminal device performs the network reselection among a plurality of identical frequency points within a first preset time interval according to the frequency point information. The execution module 520 can also include a second determination submodule that is configured to determine that the reselection information meets the preset condition if it is determined that the terminal device performs network reselection among the plurality of identical frequency points within the first preset time interval.

Optionally, the reselection information includes times information. The execution module 520 can further include a third determination submodule that is configured to determine whether the number of times of network reselections within a second preset time interval exceeds a preset times threshold according to the times information, and a fourth determination submodule that is configured to determine that the reselection information meets the preset condition if the number of times of network reselections within the second preset time interval exceeds the preset times threshold.

Figure 6:
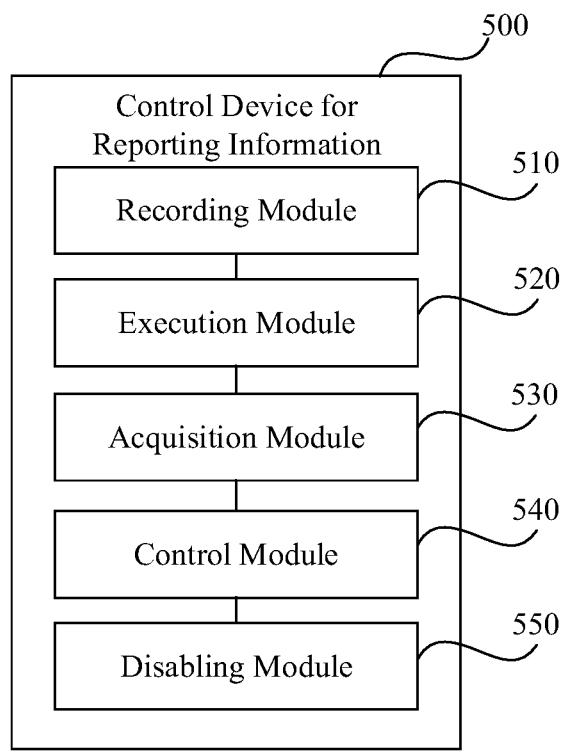
FIG. 6 is a block diagram illustrating another control device for reporting information according to an exemplary embodiment.

Optionally, FIG. 6 is a block diagram illustrating a control device for reporting information according to an exemplary embodiment. As shown in FIG. 6, the device 500 further includes an acquisition module 530, a control module 540 and a disabling module 550 That is, the device 500 includes the recording module 510, the execution module 520, the acquisition module 530, the control module 540 and the disabling module 550.

The acquisition module 530 is configured to acquire power consumption mode information of the terminal device.

The control module 540 is configured to control the terminal device to select a target cell according to a set selection strategy within a set time period if it is determined that the terminal device is in a low power consumption mode according to the power consumption mode information.

The disabling module 550 is configured to disable the network reselection function of the terminal device when the target cell has been selected.

Optionally, the device 500 can further include a first enabling module that is configured to acquire a network signal strength of the target cell before arrival of cut-off time of the set time period, and enable the network reselection function of the terminal device in the low power consumption mode if the network signal strength is lower than a preset strength threshold, and/or a second enabling module that is configured to enable the network reselection function of the terminal device in the low power consumption mode upon arrival of the cut-off time of the set time period.

With respect to the devices in the above embodiments, the specific manners for performing operations for the respective modules therein have been described in detail in the embodiments regarding the methods, which will not be elaborated herein.

The present disclosure further provides a computer readable storage medium having stored therein computer program instructions that, when executed by the processor, carry out the steps of the control method for reporting information provided by the present disclosure.

Figure 7:
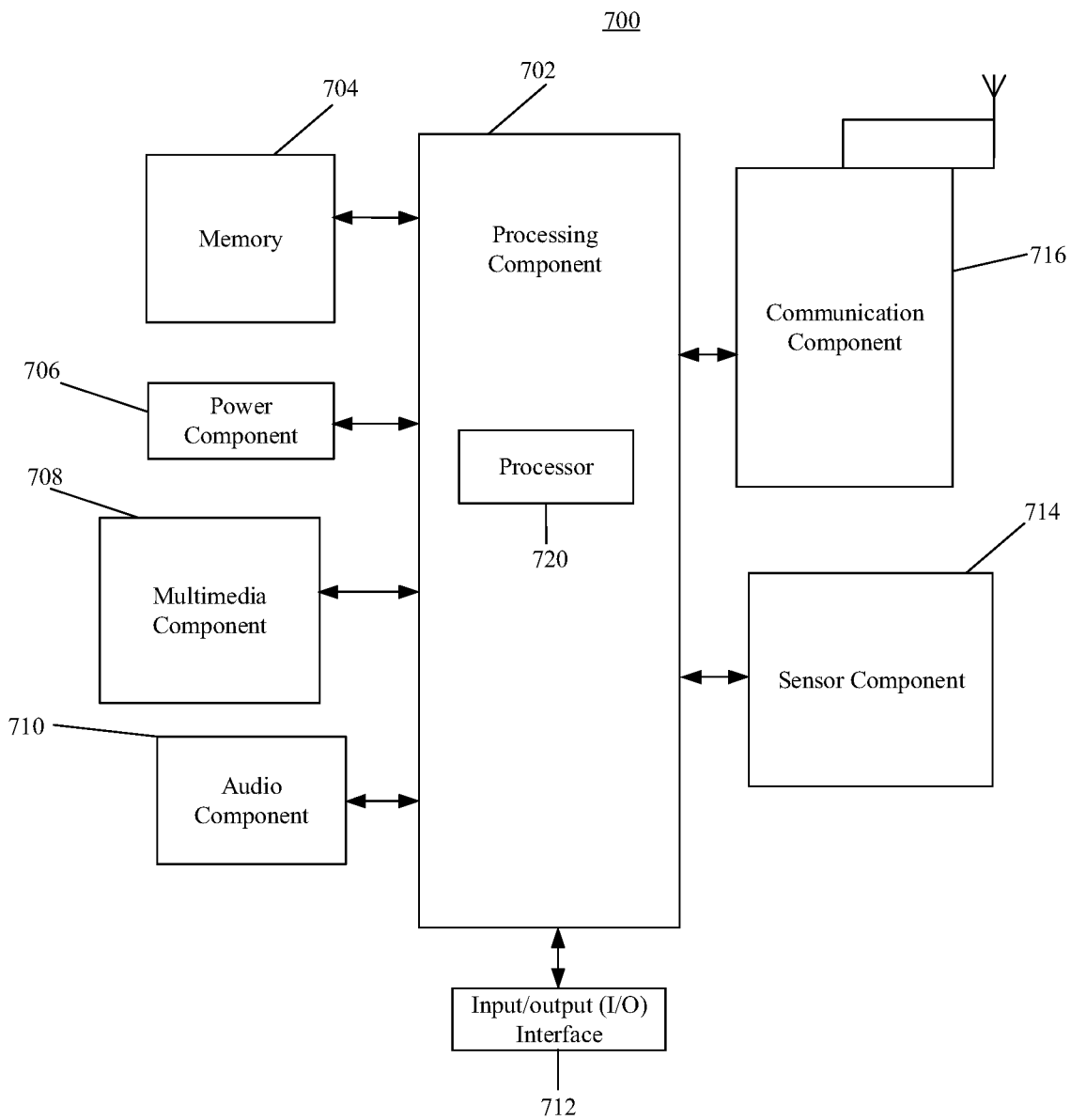
FIG. 7 is a block diagram illustrating a device according to an exemplary embodiment.

FIG. 7 is a block diagram of a device 700, according to an exemplary embodiment. Optionally, the device 700 may be configured as the control device 500 for reporting information. For example, the device 700 may be a mobile phone, a computer, a digital broadcast terminal, a messaging device, a gaming console, a tablet, a medical device, exercise equipment, a personal digital assistant, and the like.

Referring to FIG. 7, the device 700 may include one or more of the following components a processing component 702, a memory 704, a power component 707, a multimedia component 708, an audio component 710, an input/output (I/O) interface 712, a sensor component 714, and a communication component 716.

The processing component 702 typically controls overall operations of the device 700, such as the operations associated with display, telephone calls, data communications, camera operations, and recording operations. The processing component 702 may include one or more processors 720 to execute instructions to perform all or part of the steps in the above described control methods for reporting information. Moreover, the processing component 702 may include one or more modules which facilitate the interaction between the processing component 702 and other components. For instance, the processing component 702 may include a multimedia module to facilitate the interaction between the multimedia component 708 and the processing component 702.

The memory 704 is configured to store various types of data to support the operation of the device 700. Examples of such data include instructions for any applications or methods operated on the device 700, contact data, phonebook data, messages, pictures, video, etc. The memory 704 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 707 provides power to various components of the device 700. The power component 707 may include a power management system, one or more power sources, and any other components associated with the generation, management, and distribution of power in the device 700.

The multimedia component 708 includes a screen providing an output interface between the device 700 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 708 includes a front camera and/or a rear camera. The front camera and the rear camera may receive an external multimedia datum while the device 700 is in an operation mode, such as a photographing mode or a video mode. Each of the front camera and the rear camera may be a fixed optical lens system or have focus and optical zoom capability.

The audio component 710 is configured to output and/or input audio signals. For example, the audio component 710 includes a microphone ("MIC") configured to receive an external audio signal when the device 700 is in an operation mode, such as a call mode, a recording mode, and a voice recognition mode. The received audio signal may be further stored in the memory 704 or transmitted via the communication component 716. In some embodiments, the audio component 710 further includes a speaker to output audio signals.

The I/O interface 712 provides an interface between the processing component 702 and peripheral interface modules, such as a keyboard, a click wheel, buttons, and the like. The buttons may include, but are not limited to, a home button, a volume button, a starting button, and a locking button.

The sensor component 714 includes one or more sensors to provide status assessments of various aspects of the device 700. For instance, the sensor component 714 may detect an open/closed status of the device 700, relative positioning of components, e.g., the display and the keypad, of the device 700, a change in position of the device 700 or a component of the device 700, a presence or absence of user contact with the device 700, an orientation or an acceleration/deceleration of the device 700, and a change in temperature of the device 700. The sensor component 814 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an accelerometer sensor, a gyroscope sensor, a magnetic sensor, a pressure sensor, or a temperature sensor.

The communication component 716 is configured to facilitate communication, wired or wirelessly, between the device 700 and other devices. The device 700 can access a wireless network based on a communication standard, such as WiFi, 2G, 3G, 4G or 5G, or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 700 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described control methods for reporting information.

In exemplary embodiments, there is also provided a non-transitory computer-readable storage medium including instructions, such as included in the memory 704, executable by the processor 720 in the device 700, for performing the above-described control methods for reporting information. For example, the non-transitory computer-readable storage medium may be a ROM, a RAM, a CD-ROM, a magnetic tape, a floppy disc, an optical data storage device, and the like.

In another exemplary embodiment, there is further provided a computer program product, which includes computer programs that are executable by a programmable device, and also have codes that, when executed by the programmable device, perform the above-mentioned control methods for reporting information.

Other embodiments of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope of the disclosure being indicated by the following claims.

It will be appreciated that the present invention is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A control method for reporting information, comprising:
   recording reselection information of a network reselection in response to an action of the network reselection of a terminal device;
   determining whether the reselection information meets a preset condition; and
   disabling a function of the terminal device to report the reselection information when the reselection information meets the preset condition; wherein,
   the reselection information includes frequency point information, and
   determining whether the reselection information meets the preset condition further comprises:
      determining whether the terminal device performs the network reselection among a plurality of identical frequency points within a first preset time interval based on the frequency point information; and
      determining that the reselection information meets the preset condition when the terminal device performs the network reselection among the plurality of identical frequency points within the first preset time interval.

2. A control device for reporting information, comprising:
   a processor;
   a memory for storing instructions executable by the processor;
   wherein the processor is configured to:
      record reselection information of a network reselection in response to an action of network reselection of a terminal device;
      determine whether the reselection information meets a preset condition; and
      disable a function of the teiiiiinal device to report the reselection information when the reselection information meets the preset condition; wherein,
   the reselection information includes frequency point information, and
   the processor is further configured to:
      determine whether the terminal device performs the network reselection amono a plurality of identical frequency points within a first preset time interval based on the frequency point information; and
      determine that the reselection information meets the preset condition when the terminal device performs the network reselection among the plurality of identical frequency points within the first preset time interval.

3. A non-transitory computer-readable storage medium having stored therein computer program instructions that, when executed by a processor, causes the processor to implement the method recited in claim 1.

* * * * *